G. W. WALKER.
Ash Pail.
No. 33,058.
Patented Aug. 13, 1861.
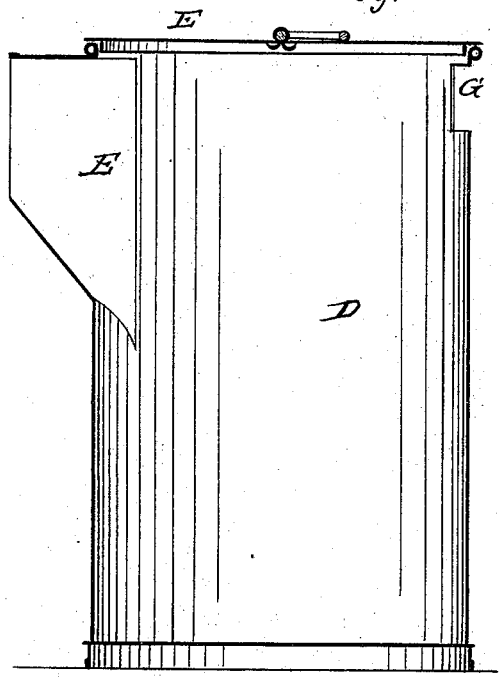
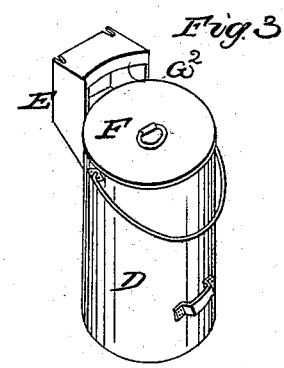
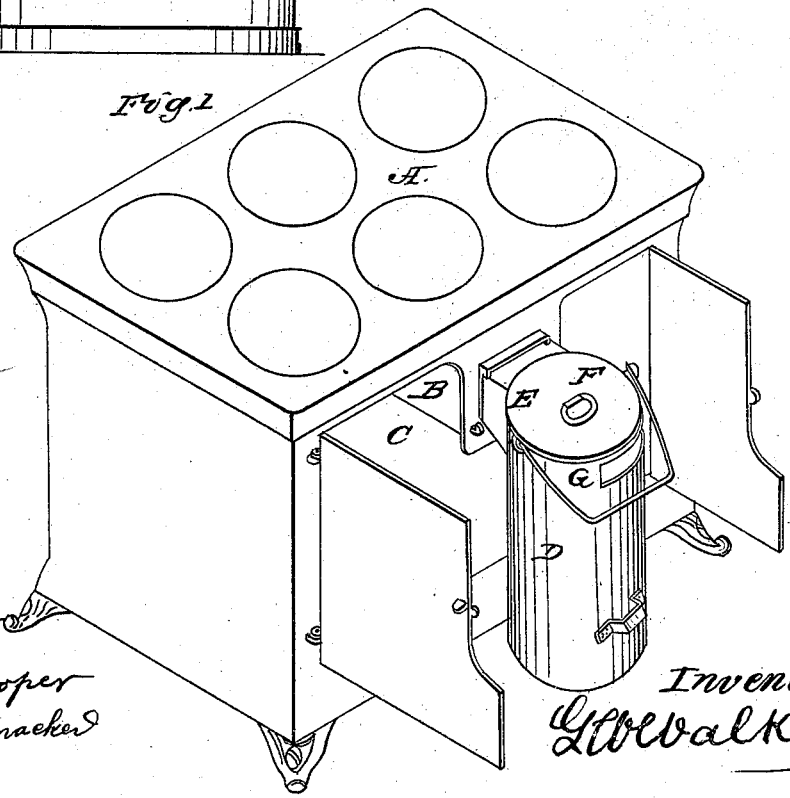

UNITED STATES PATENT OFFICE.

GEO. W. WALKER, OF BOSTON, MASSACHUSETTS.

ASH-PAIL.

Specification of Letters Patent No. 33,058, dated August 13, 1861.

*To all whom it may concern:*

Be it known that I, GEO. W. WALKER, of Boston, in the county of Suffolk and State of Massachusetts, have invented an Improved Ash-Pail, of which the following is a full, clear, and exact description, reference being had to the accompanying drawing, making part of this specification, in which—

Figure 1, is a view of a cooking stove with my improved pail applied to it. Fig. 2, a section through the pail. Fig. 3, a view of a modification of my invention.

In those stoves and ranges in which the fire pot has been suspended within the oven, the ashes has been raked out from beneath the grate into a permanent receptacle or receiver attached to the stove, from which it was subsequently removed. As but very little space can be allowed beneath the grate bars the ashes requires to be frequently raked out by which much dust is raised which falls upon the articles being cooked or settles in the apartment. The removal of the ashes from the receptacle again creates a dust and the receptacle itself adds to the weight and expense of the stove.

My invention has for its object to obviate the above objections and to remove the ashes from the stove, without making a dust either upon the articles being cooked or in the apartment and consists in a covered pail having a spout to fit the ash door, and an opening through which the scraper can be inserted, the opening being of such a size that the dust occasioned by the drawing out of the ashes and by its falling into the pail is all drawn up the chimney and is not thrown into the room or upon the stove or cooking utensils.

In the accompanying drawings A. (Fig. 1.) is a cooking stove having the fire pot B. suspended within the oven C. The ash pit is shallow but of sufficient depth to accommodate an ordinary stove scraper, and has a door in its front end.

The pail D. which forms the subject of my invention is furnished with a covered spout E. which exactly fits the door of the ash pit, and with a cover F. Directly opposite the mouth of the spout E is an opening G through which the scraper is inserted by which the ashes are drawn from the ash pit into the pail. While this is being done the draft through the stove causes a draft into the opening G by which the dust occasioned by raking out the ashes is all drawn up chimney.

It is obvious that when the ashes are once raked out from under the grate it does not again require to be disturbed in the apartment and that it may be carried off in the pail and disposed of.

In Fig. 3 is seen a modification of my invention in which the spout is somewhat elevated above the top of the pail so that the opening $G^2$ in lieu of being in the pail itself, is in the spout.

With a pail thus constructed a shorter handled scraper may be used and the apartment and cooking utensils are equally protected from dust.

What I claim as my invention and desire to secure by Letters Patent is—

The within described ash pail with its cover F, spout E, and opening G operating in the manner substantially as set forth for the purpose specified.

GEO. W. WALKER.

Witnesses:
SAM. COOPER,
P. E. TESCHEMACHER.